United States Patent
Faulkner et al.

(10) Patent No.: US 6,349,375 B1
(45) Date of Patent: Feb. 19, 2002

(54) COMPRESSION OF DATA IN READ ONLY STORAGE AND EMBEDDED SYSTEMS

(75) Inventors: David Vincent Faulkner, Nashua; Stephen Jay Klein, Hollis; Bruce Eric Mann, Mason, all of NH (US); Tavit K. Ohanian, Waltham; Thomas Courtenay Porcher, Stow, both of MA (US); Philip John Trasatti, Brookline, NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/309,061

(22) Filed: May 10, 1999

Related U.S. Application Data

(63) Continuation of application No. 08/691,229, filed on Aug. 1, 1996, now abandoned, which is a continuation of application No. 08/190,413, filed on Sep. 2, 1994, now abandoned.

(51) Int. Cl.$^7$ .................................................. G06F 9/26
(52) U.S. Cl. ........................ 711/173; 711/170; 711/171; 711/172
(58) Field of Search ................. 711/170–173, 202–207; 707/206; 708/203

(56) References Cited

U.S. PATENT DOCUMENTS

| | | | | |
|---|---|---|---|---|
| 4,638,426 A | * | 1/1987 | Chang et al. ................ 711/207 |
| 4,929,946 A | * | 5/1990 | O'Brien et al. ................ 341/87 |
| 5,088,036 A | * | 2/1992 | Ellis et al. .................... 707/206 |
| 5,101,487 A | * | 3/1992 | Zalenski ...................... 711/221 |
| 5,237,460 A | * | 8/1993 | Miller et al. ............. 711/173 X |
| 5,394,537 A | * | 2/1995 | Courts et al. ................ 711/202 |
| 5,617,552 A | * | 4/1997 | Garber et al. .................. 711/1 |

* cited by examiner

*Primary Examiner*—Than Nguyen
(74) *Attorney, Agent, or Firm*—William J. Kubida; Kent A. Lembke; Hogan & Hartson LLP

(57) ABSTRACT

This disclosure involves the combination of data compression and decompression with a virtual memory system. A number of computer systems are discussed, including so-called embedded systems, in which data is stored in a storage device in a compressed format. In response to a request for data by a central processing unit (CPU), the virtual memory system will first determine if the requested data is present in the portion of main memory that is accessible to the CPU, which also happens to be where decompressed data is stored. If the requested data is not present in the decompressed portion of main memory, but rather is present in a compressed format in the storage device, the data will be transferred into the decompressed portion of main memory through a demand paging operation. During the demand paging operation, the compressed data will be decompressed. Likewise, if data is paged out of the decompressed portion of main memory, and that data must be saved, it can also be compressed before storage in the storage device for compressed data.

25 Claims, 4 Drawing Sheets

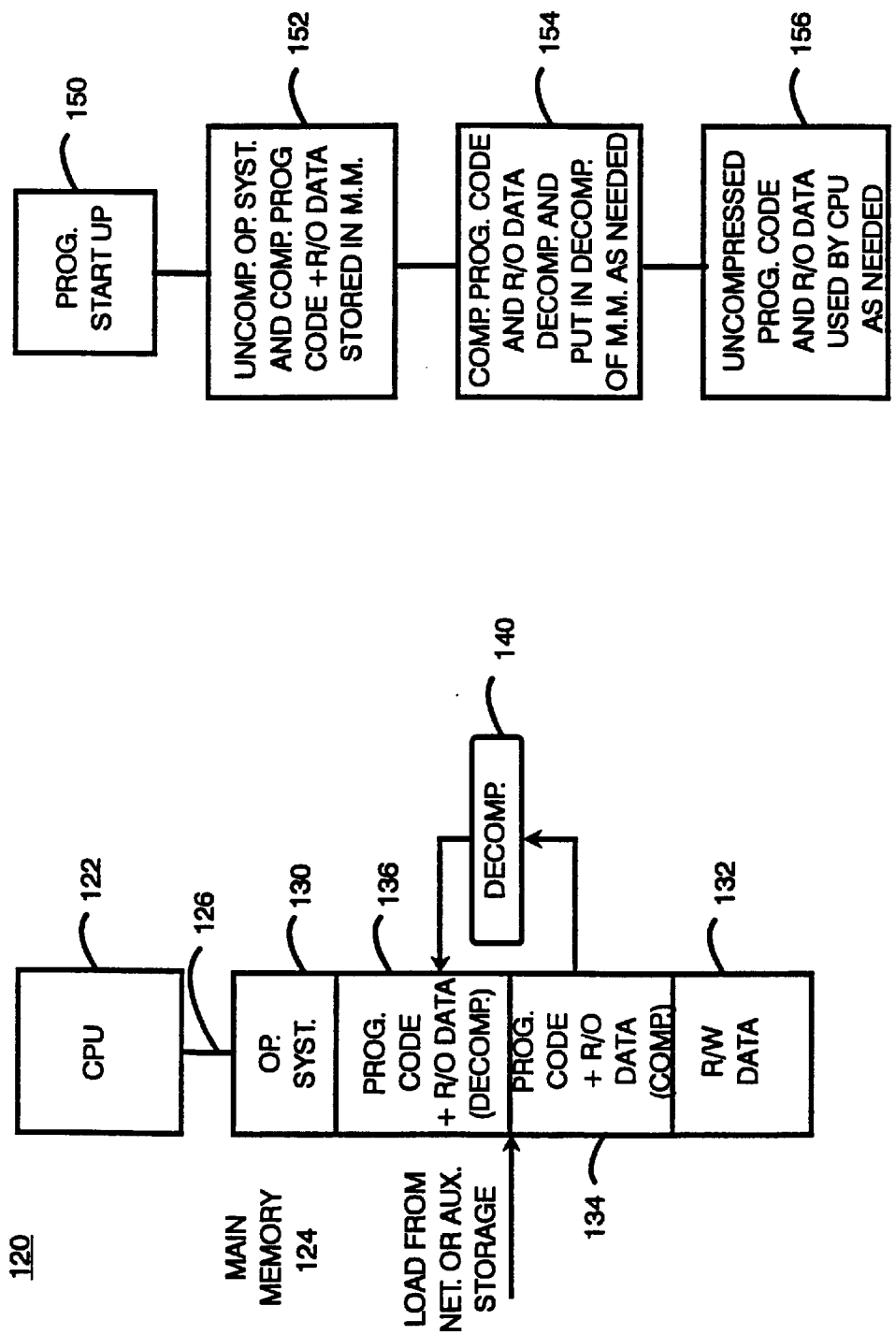

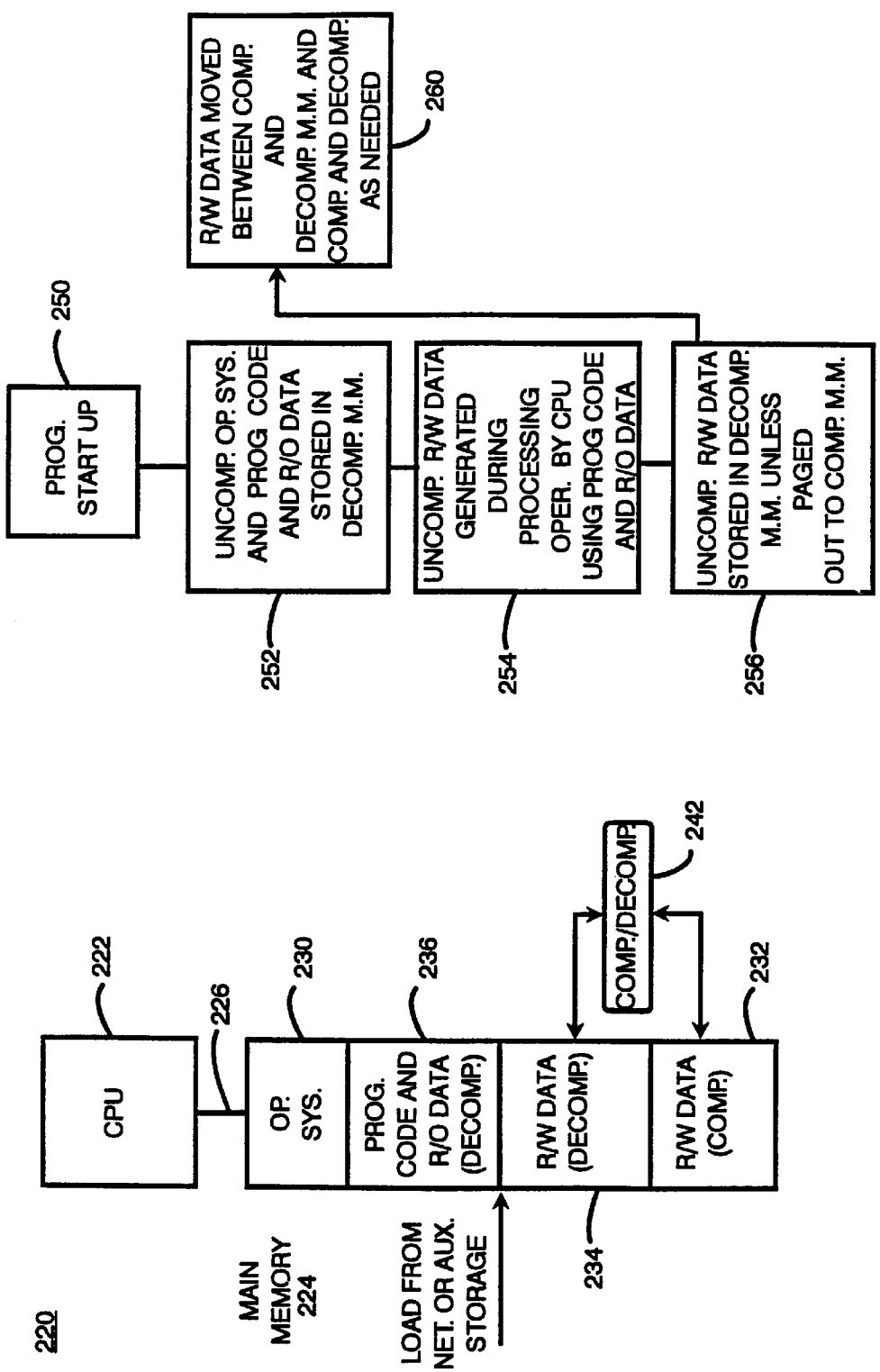

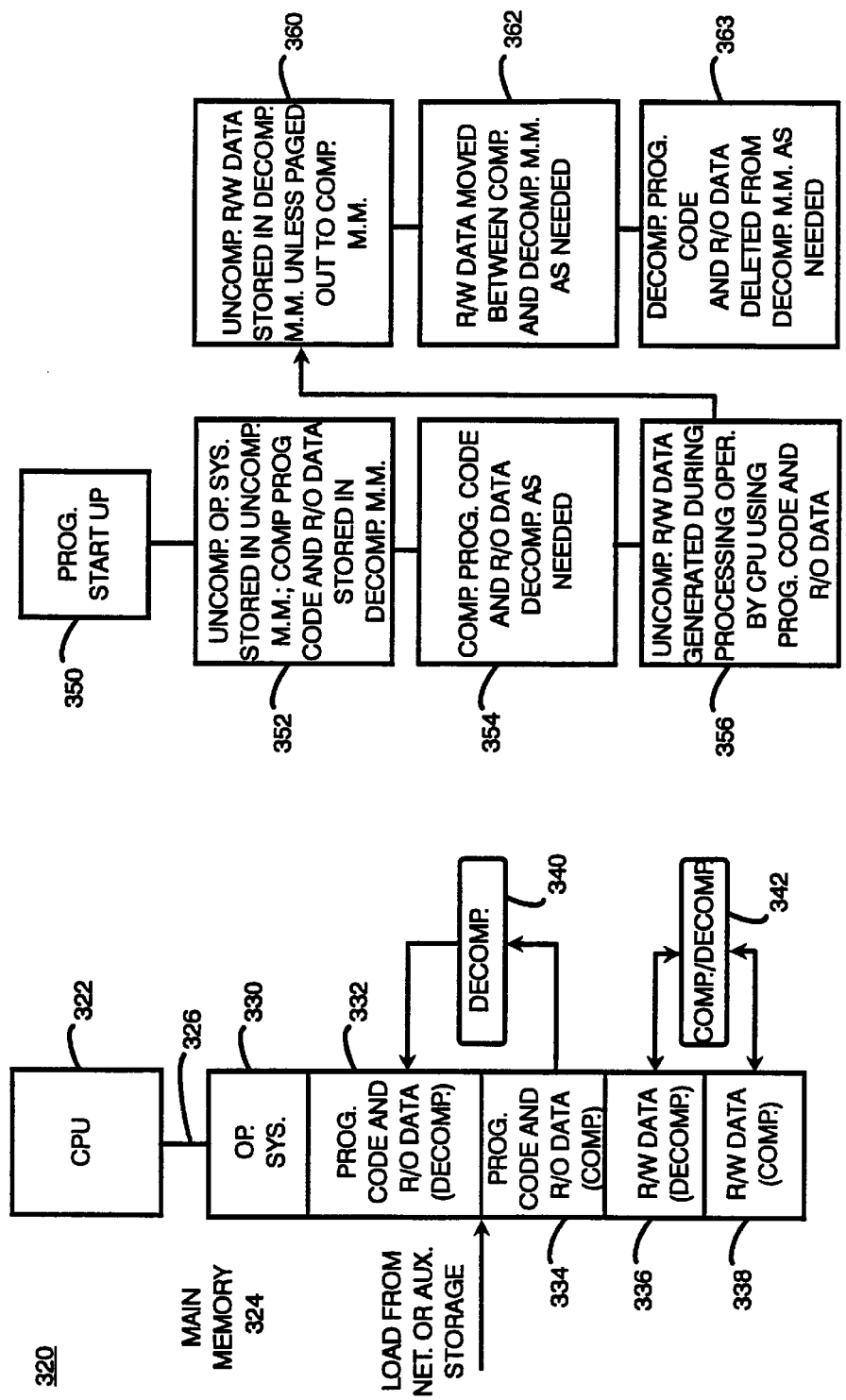

COMPRESSION OF DATA IN READ ONLY STORAGE AND EMBEDDED SYSTEMS

This application is a continuation of application Ser. No. 08/691,229 filed Aug. 1, 1996 now abandoned which is a File Wrapper Continuation of 08/190,413, filed Feb. 2, 1994 now abandoned.

FIELD OF THE INVENTION

This invention relates to compressing and decompressing program code and data in a computer system, particularly in a read only memory device and the main memory of an embedded computer system.

SOURCE CODE COPYRIGHT

Appended to the detailed description is Appendix A, which contains C language, source code files, which make up compression and decompression algorithms. The source code is subject to copyright protection. The copyright owner, Digital Equipment Corporation, has no objection to the reproduction of the patent document, containing Appendix A, as it appears in the Patent and Trademark Office Patent file or records. Excepting only this limited reproduction right, the copyright owner expressly reserves all other copyright rights whatsoever.

BACKGROUND OF THE INVENTION

Computer systems typically implement a memory hierarchy, having a main electronic (RAM) memory which is augmented by different forms of mass storage. During processing operations, main memory commonly holds the program code and data which is accessed by the central processing unit (CPU) for processing. Auxiliary, mass storage devices, such as magnetic disks, magnetic tapes, optical disks, read only memory (ROM) storage devices, or a network node, contain additional information which is transferred into main memory as needed by the CPU. Since the capacities of such auxiliary storage devices substantially exceed the capacity of main memory, many modern computer systems include some type of virtual memory system.

Through the implementation of virtual memory and demand paging, portions of program code and data stored in the auxiliary storage can be retrieved into main memory so that it can be processed by the CPU as needed. In such a system, not only is data periodically transmitted to main memory by auxiliary storage, but also main memory will periodically have to update auxiliary storage in the event that specific data has been modified by the CPU during processing operations and main memory consequently contains the only correct version of the data.

Unlike the computer system discussed above, in which main memory and auxiliary storage are very regularly exchanging data, a so-called "embedded system" has a main memory which operates more independently. In an embedded system the main memory is typically loaded at the commencement of processing operations with program code and data from either a network or auxiliary storage. Thereafter, the CPU processes the data in main memory, but typically does not transmit data back from the main memory to some auxiliary storage device, or some other node on a connected network.

The efficient use of space in any storage medium is a highly desirable objective. Typically the greatest premium is placed on the efficient use of storage space in main memory, given that the electronic RAM's which comprise main memory are the most costly storage device in a memory hierarchy, relatively speaking. Therefore, the need for efficient use of storage space is especially important in embedded systems given that their main memories tend to operate without support from auxiliary storage after initial loading. What is needed therefore is an approach to storage of data in computer systems, especially embedded computer systems, which improves the use of available storage space in the various storage devices.

SUMMARY OF THE INVENTION

In one embodiment of the invention, an apparatus for processing data includes a memory device, such as a main memory, for storing decompressed data, which is directly accessible to a CPU. The apparatus further includes another memory means in which data is stored in a compressed format, which is not directly accessible to the CPU. In order to access data the CPU transmits a virtual address which is subsequently translated into the physical address by which the virtual memory system determines if the requested data is present in the accessible portion of main memory.

If it is not, then the virtual memory system will transfer data from the compressed data storage device to the decompressed portion of main memory. In order to do so, the apparatus includes a means for decompressing the compressed data when it is transferred.

In yet other embodiments of the invention, when data is paged out of the decompressed portion of main memory it is compressed before it is stored in the storage device containing compressed data. Still further embodiments of the invention include the method by which data is compressed and decompressed in connection with a demand paging or a page out operation by the virtual memory.

By providing the compression and decompression of data in connection with a virtual memory system, this invention addresses the above discussed problems by providing an efficient means for storing data, particularly data stored in the main memory of an embedded computer system.

Given that this description only briefly summarizes the invention, a more complete understanding of the invention, as well as its objects, features, and advantages will be appreciated upon consideration of the detailed description of the preferred embodiment, presented in conjunction with the accompanying drawings, and the claims.

BRIEF DESCRIPTION OF THE DRAWINGS

FIG. 2A shows a block diagram of a computer system in accordance with the present invention, the system including a CPU coupled with a main memory which is divided into a portion which contains compressed program code and read only data and another portion which contains decompressed program code and read only data.

FIG. 2B shows a flow diagram of the operation of the computer system shown in FIG. 2A.

FIG. 3A shows a block diagram of a computer system in accordance with the present invention, the system including a CPU coupled with a main memory which is divided into a portion which contains compressed read/write data and another portion which contains decompressed read/write data.

FIG. 3B shows a flow diagram of the operation of the computer system shown in FIG. 3A.

FIG. 4A shows a block diagram of a computer system in accordance with the present invention, the system including a CPU coupled with a main memory which is divided into portions which contain compressed program code, read only data, and read/write data, and other portions which contain decompressed program code, read only data, and read/write data.

FIG. 4B shows a flow diagram of the operation of the computer system shown in FIG. 4A.

DETAILED DESCRIPTION OF THE PREFERRED EMBODIMENT

A. COMPUTER SYSTEM WITH COMPRESSED READ ONLY DATA.

Figure 1B:
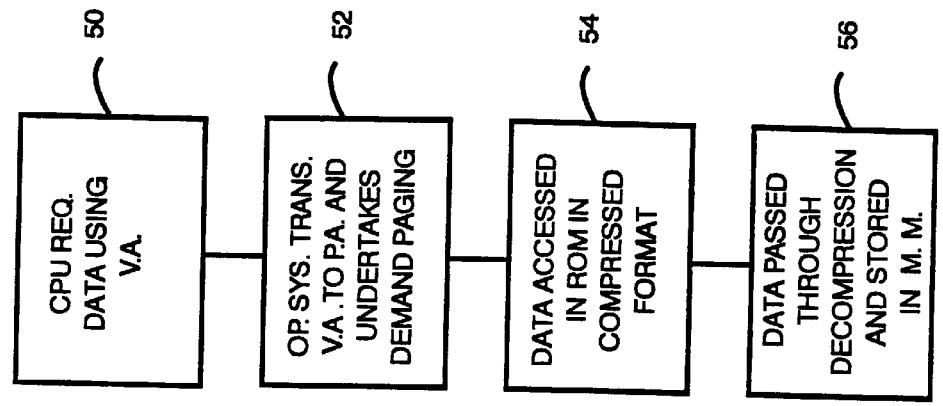
FIG. 1B shows a flow diagram of the operation of the computer system shown in FIG. 1A.
Figure 1A:
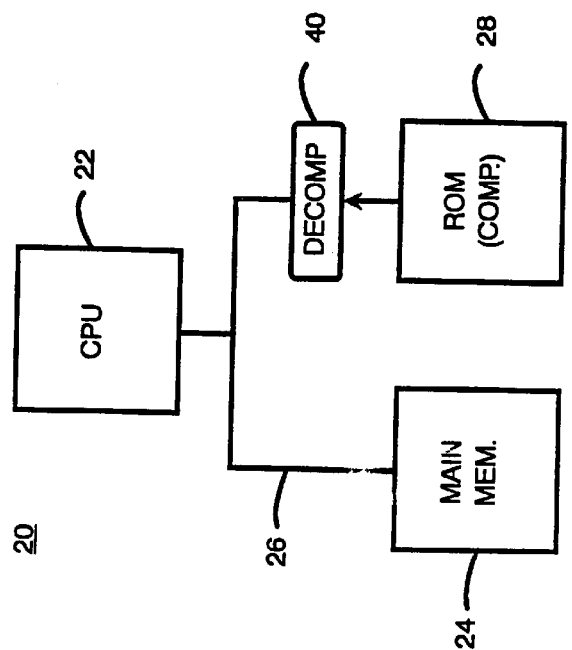
FIG. 1A shows a block diagram of a computer system in accordance with the present invention, the system including a CPU coupled with a main memory, and a ROM in which compressed data is stored.

Referring first to FIG. 1A, a computer system 20 includes CPU 22 coupled to main memory 24 over system bus 26. In addition to main memory 24, ROM 28 is also coupled to the system bus 26. In accordance with the present invention, ROM 28 includes read only program code that is to be accessed and used by CPU 22, or ROM 28 contains read only data which will be processed by CPU 22.

System 20 implements a virtual memory system, such that when CPU 22 requests the data at a particular virtual address of the page, the operating system of system 20 will first determine if that particular data is currently present in main memory 24. If there is no mapping of the virtual address to a physical address in main memory 24, then the normal processing of the CPU 22 is interrupted as the system 20 enters a page translation fault routine which is a software program included in the operating system. A "page" is a contiguous section of virtual memory that is addressable as a single unit. For example, in many systems a page may be 512 bytes of contiguous data, which are all addressable by the same virtual address.

Through this routine, or "trap", the requested data is found elsewhere in some other memory device in the system 20, such as in an auxiliary storage device. This is accomplished by translating the virtual memory address to an auxiliary storage address, usually on a page boundary. The system 20 then allocates a physical address range to be used for the virtual address range, and the data stored in auxiliary storage is then read into main memory 24. Once the data is retrieved into main memory 24, CPU 22 can then access that data and process it as originally intended. This above described method by which data is retrieved from auxiliary storage and placed in main memory 24 in response to a request by the CPU 22 is referred to as "demand paging".

As will be discussed below, in this detailed description the term "demand paging" is also applied to the transfer of compressed data, stored in a compressed data portion of main memory, to a decompressed data portion of main memory. Thus, in its most general sense, the term "demand paging" refers to the virtual memory transfer of data from a data storage area in which the data is not usable directly by the CPU, to another data storage area in which the data is usable directly by the CPU.

Additionally, it should be noted that operating systems which implement a virtual memory demand paging approach also typically define a page replacement policy. Predictably, there will come a point in the operation of computer system 20 in which system 20 needs to discard data that resides in main memory 24 in order to make room for new data that must be demand paged into main memory 24 for use by CPU 22, as described above. Accordingly, system 20 must decide which pages currently resident in main memory 24 will be displaced in order to make the necessary room. Different operating systems may include different replacement policies, some of which are based on removing the page or pages that have not been processed by CPU 22 for the longest period of time. Other operating systems may use another approach, however, the important point is that each has a systematic method for making room for incoming data.

In many computer systems that discard pages from main memory 24 in order to make room for incoming data, it is often necessary to write that data back to an auxiliary storage, such as a magnetic disk. This occurs principally when the CPU 22 modified the data, and the modified data must be preserved. To simply delete modified data from main memory 24 would eliminate the only correct version of the data in system 20. Therefore, if the data has been modified, and must be preserved, during the demand paging operation, not only will the selected data be removed from main memory 24 to make room for new data, but the replaced data will be re-written back to auxiliary storage. On the other hand, if the data has not been modified, or it does not have to be preserved, it can merely be discarded by system 20.

In accordance with the present invention and referring again to FIG. 1A, the data in ROM 28 has been subjected to a compression algorithm such that the binary data is not stored in its true, original format. Rather, through the use of the compression algorithm, the true binary data has been compressed to a more condensed format. For the purpose of this detailed description, the algorithm which is used to compress data in the systems discussed herein will be referred to as "COMP-ALG", while a decompression algorithm, which decompresses the compressed data, will be referred to as "DECOMP-ALG". Although preferred compression and decompression algorithms are discussed below, it will be clear to those skilled in the art that any number of such algorithms could be implemented provided they are "complementary" to one another, meaning one decompresses what the other compresses, and vice versa. Furthermore, it may be necessary to choose such algorithms on the basis of the size of the block or page of data that is transferred by the operating system during a demand paging operation.

As shown in the block diagram of FIG. 1A, decompressor 40 is included in computer system 20. Although in the block diagram format it appears that decompressor 40 is physically in the path of data transmitted between ROM 28 and other components on the system bus, this need not be so. Instead, decompressor 40 could be implemented in the operating system of system 20 such that whenever data is transmitted out of ROM 28 it is processed by the CPU 22 and restored to the original binary format of the data that is usable by CPU 22. In one implementation of system 20, which includes a virtual memory based on demand paging, data which is transmitted out of ROM 28 during the demand paging operation could be decompressed at the same time it is retrieved from ROM 28. Consequently, there is virtually no additional time, or system "overhead", required for decompression, as the application of DECOMP-ALG occurs as the data is transmitted into the main memory 24.

In an alternate embodiment, decompressor 40 could be implemented as a specialized piece of hardware that processes the compressed data in ROM 28 in order to decompress it back to its original, true value. Once again, this can be accomplished as part of the demand paging operation, which adds virtually no additional overhead to the process by which main memory 24 is filled with data.

Given that DECOMP-ALG is complementary to COMP-ALG, data initially compressed prior to storage in ROM 28 will be decompressed when it is processed by decompressor 40.

Referring now to FIG. 1B a flow diagram is provided to illustrate the typical operation of the embodiment of the invention shown in block diagram format in FIG. 1A. The process begins with CPU 22 requesting data by reference to the virtual address of the data (step 50). After it is determined that the main memory 24 does not contain the requested data, the operating system will translate the virtual address into an auxiliary storage address (step 52). In this particular example, the auxiliary storage address will be assumed to be to a storage location in ROM 28, which contains the requested data in compressed format (step 54). When the requested data is retrieved through the demand paging process discussed above, it will be passed through decompressor 40 prior to storage in main memory 24 (step 56). Thus, the decompression of the data in this particular instance will not take an appreciably greater amount of time than the time ordinarily taken to perform simple demand paging.

The advantage of this particular approach is that compressed data stored in ROM 28 naturally consumes less storage space than the same data stored in a decompressed format. Assuming a given amount of ROM 28 storage space, more compressed data than decompressed data could be stored in that given space. Alternatively, compressed data can be stored in a smaller amount of ROM 28 space than the same decompressed data. In particular embodiments of the invention it has been found that as much as a 50% space saving can be achieved by employing the technique of storing compressed data in ROM 28. This, of course, results in a more efficient use of storage space within system 20.

B. MAIN MEMORY WITH COMPRESSED DATA.

Referring now to FIG. 2A, a block illustration of another embodiment of the present invention is provided. FIG. 2A shows a computer system 120 which includes CPU 122 coupled with main memory 124 over bus 126. In this particular embodiment, system 120 is an embedded system, in which data is transmitted into main memory 124 over a network (not shown). It should be understood that it is also possible for main memory 124 to receive data from an auxiliary storage device; however, for the purpose of this detailed description it will be assumed that the data in main memory 124 is loaded from a network. After loading, CPU 122 will process the data in main memory 124 quite independently, without main memory 124 needing to regularly receive or exchange data with other nodes on the network, or auxiliary storage devices. Typically, the type of information loaded into main memory 124 is operating system code, as well as program code and read only data.

In FIG. 2A, main memory 124 is shown to be logically divided into a number of segments, or portions, largely determined by the nature of the information contained in any given segment. More particularly, portion 130 of main memory 124 contains the operating system code, while another portion 132 is designated for storing read/write data, which is generated during the processing operations of CPU 122.

In accordance with the present invention, another portion 134 of main memory 124 includes a compressed version of program code and read only data which is loaded from the network. Yet another portion 136 of main memory 124 is reserved for decompressed program code and read only data. In this particular embodiment, the compressed program code and data is compressed by means of the application of COMP-ALG. Therefore, the compressed program code and read only data is not in its true binary format, or a format that can be directly used by CPU 122; rather, it must be decompressed by means of DECOMP-ALG before it is usable by CPU 122.

Finally with respect to FIG. 2A, system 120 includes decompressor 140, which implements DECOMP-ALG through which the compressed program code and read only data can be decompressed. As discussed above in connection with decompressor 40, shown in FIG. 1A, decompressor 140 can be implemented as specialized hardware or circuitry; however, in the preferred embodiment decompressor 140 is included as a software routine in the operating system of system 120. In the block rendering of FIG. 2A, decompressor 140 is shown to logically link together portions 134 and 136 of main memory 124 such that compressed code and data stored in portion 134 can be decompressed and stored in portion 136, in the manner detailed below.

Referring now to FIG. 2B, a flow diagram is provided describing the process by which system 120 of FIG. 2A is operated. Upon program start up (step 150) the uncompressed operating system and the compressed program code and read only data are transmitted to main memory 124 from the network (step 152). After this initial loading of main memory 124, CPU 122 will undertake its normal processing operations. During such operations, CPU 122 requests data that is stored in portion 134 of main memory 124, namely the portion containing the compressed version of the program code and read only data.

In the preferred embodiment, system 120 includes a virtual memory, such that CPU 122 will request the data using a virtual address. The operating system determines that although the requested data is actually in the physical memory space of main memory 124, it effectively is not. This is due to the fact that the requested data, which is in a compressed format unusable by CPU 122, is treated as if it is not really physically present in main memory 124. Accordingly, the operating system will use the virtual address provided by CPU 122 to locate the requested, compressed data and undertake a demand paging operation to bring the requested data into portion 136 of main memory 124, which is for uncompressed data. At the time that such compressed data is transferred between memory portions 134 and 136 it will be processed by decompressor 140 and decompressed to its true binary format, which is usable by CPU 122.

It can now be seen that the term "demand paging" is used to refer to the transfer of data from the compressed portion 134 to the decompressed portion 136 of main memory 124. In other words, in this detailed description "demand paging" refers to not just the transfer of data from an auxiliary storage device into main memory, but also the transfer of data from one portion of main memory, in which the data is stored in a compressed condition making it unusable by CPU 122, to another portion of main memory, in which the data is stored in a decompressed condition making it usable by the CPU 122.

After the data is decompressed, CPU 122 uses the decompressed data to generate data pursuant to normal system operations. Data that is generated by CPU 122 during its processing operations can then be stored in portion 132 of main memory 124, which is the segment that is intended to include read/write data.

It should be noted at this point that there is a certain amount of additional time required for system 120 to process the decompressed data in order to generate the compressed data. In other words, CPU 122 would be able to more quickly access the program code and read only data stored in main memory 124 if it was in a decompressed format. On the other hand, as a result of using main memory 124 to store compressed data, system 120 is able to more efficiently store information in main memory 124, and it has been found that the delay does not appreciably impact the performance of system 120.

For example, it will be assumed that a given, model embedded computer system, which does not include the design of the present invention, includes a CPU and a main memory. In the main memory there is 1 Mbyte of storage space allocated for the operating system, 4 Mbytes allocated for program code and read only data, and 5 Mbytes allocated for read/write data. Thus the total main memory storage requirements of this model system is 10 Mbytes.

By contrast, it has been found that by using the storage design described in connection with FIGS. 2A and 2B significant storage savings can be achieved. More specifically, in allocating the same amount of space for the operating system, 1 Mbyte, and for the read/write data, 5 Mbytes, the program code and read only data can be stored in a total of 2.5 Mbytes of space. In this particular implementation 2 Mbytes would be used to store the compressed version and 0.5 Mbyte would be used to store the decompressed version of the program code and the read only data. Thus, using system 120 discussed in connection with FIGS. 2A and 2B, an embedded system 120 which includes the same amount of data as the 10 Mbyte model could be implemented using 8.5 Mbytes of storage.

Referring now to FIG. 3A, a block illustration of yet another embodiment of the present invention is provided. By comparing FIGS. 3A and 2A it can be seen that there are a number of similar components in the two illustrations, with the block elements of FIG. 3A being numbered in the 200's. To the extent that the design and operation of system 220 in FIG. 3A has similarities with the design and operation of FIG. 2A, it should be understood that the discussion of FIG. 2A provides the more complete details on general system operation which will not be repeated here. On the other hand, the focus in connection with the discussion of FIGS. 3A and 3B will be on any differences between the systems of FIGS. 3A and 2A.

As seen in FIG. 3A, computer system 220, which is also an embedded system, includes CPU 222 coupled with main memory 224 over bus 226. Main memory 224 is again logically divided into a number of portions; however, in this particular embodiment portion 230 contains the decompressed version of the operating system, and portion 236 contains the decompressed version of the program code and the read only data. As indicated, this particular data is loaded into main memory 224 from the network, though it could also be loaded from an auxiliary memory device. In this embodiment, another portion 232 of main memory 224 is reserved for compressed read/write data and yet another portion 234 is reserved for decompressed read/write data. As indicated above, read/write data is generated by CPU 222 using the program code and read only data stored in main memory 224.

Portions 232 and 234 are linked by compressor/decompressor 242, which has the capability of using COMP-ALG, discussed above, to compress read/write data transmitted from portion 232 to portion 234. Conversely, compressor/decompressor 242 also has the ability to decompress data transmitted from portion 234 to portion 232, using DECOMP-ALG. As discussed above, compressor/decompressor 242 could be implemented as a specialized hardware component; however, in the preferred embodiment it is implemented as software routine in the operating system.

Referring now to FIG. 3B, a flow diagram is provided to illustrate the manner in which system 220 is used. Upon program start up (step 250) the decompressed operating system, program code, and read only data are stored in their respective portions of main memory 224 (step 252). After this initial loading of main memory 224, CPU 222 will undertake its normal processing operations. During such operations, CPU 222 uses decompressed read only data and program code to generate read/write data pursuant to normal system operations (step 254). The read/write data generated is then stored in portion 234 of main memory 224, which is the segment that is intended to include decompressed read/write data, until it is paged out as discussed below (step 256).

Once again, system 220 includes a virtual memory, which has demand paging capabilities. Therefore, it is expected that at some point system 220 will need to transfer, or "page out", data that is contained in portion 234 of main memory 224, due to the fact that it has or will run out of storage space. In accordance with the present invention and using the particular page replacement policy implemented in the operating system, system 220 will demand page the decompressed read/write data out of portion 234. That decompressed data will be processed through compressor/decompressor 242 such that it is compressed by COMP-ALG before it is stored in portion 232. This, of course makes additional room in portion 234 for newly generated read/write data.

Additionally, if at any time CPU 222 wishes to further process read/write data which is no longer in portion 234, the operating system treats the requested data as effectively absent from physical main memory 224. Using a virtual address produced by CPU 222, the operating system will locate the requested, compressed data in portion 232 and undertake a demand paging operation to bring the requested data into portion 234 of main memory 224. At the time that such compressed data is transferred between memory portion 232 and 234 it will be processed by compressor/decompressor 242 and decompressed to its true binary format, which is usable by CPU 222. In this manner, read/write data can be continually moved back and forth between compressed portion 232 and decompressed portion 234 as required by the program operation (step 260).

Again there is a certain processing overhead in having to compress and decompress data in the manner discussed above. On the other hand, system 220 is again able to more efficiently store information in main memory 224. Referring again to the model 10 Mbyte system discussed above, it has been found that using the technique discussed in connection with FIGS. 3A and 3B, system 220 can include the same amount of data as the 10 Mbyte model using only 6.5 Mbytes of storage. In such an implementation, there is 1 Mbyte of storage space allocated for the operating system, 4 Mbytes allocated for program code and read only data, 1 Mbyte allocated for the compressed version of read/write data, and 0.5 Mbyte allocated for the decompressed version of read/write data. Again this results in significant space savings in main memory 224 storage.

FIG. 4A provides a block illustration of still another embodiment of the present invention. In this instance embedded system 320 includes a combination of the features shown and discussed in connection with FIGS. 2A, 2B, 3A, and 3B. Again, to the extent possible, similar components are number similarly, with the components in FIG. 4A being numbered in the 300's. Again, the fuller details of the general operation of system 320 are provided in connection with FIGS. 2A, 2B, 3A, and 3B; therefore, the focus of the discussion in connection with FIGS. 4A and 4B will be on certain differences.

Embedded computer system 320, in FIG. 4A, includes CPU 322 coupled with main memory 324 over bus 326. The logical division of main memory 324 is into portion 330, which contains the decompressed operating system. Portion 332 is for the decompressed version of the program code and the read only data, while portion 334 is for the compressed version of the program code and the read only data. The operating system, compressed program code, and compressed read only data are loaded into main memory 324 over the network.

Additionally, another portion 338 of main memory 324 is reserved for compressed read/write data and portion 336 is reserved for decompressed read/write data. Read/write data is generated by CPU 322 using the program code and read only data stored in main memory 324.

As shown in FIG. 4A, portions 332 and 334 are linked by decompressor 340, which has the ability to decompress data transmitted between portions 332 and 334. On the other hand, portions 336 and 338 are linked by compressor/decompressor 342, which compresses read/write data transmitted from portion 336 to portion 338, and decompresses data transmitted from portion 338 to portion 336. Both decompressor 340 and compressor/decompressor 342 could be implemented as hardware, but are preferably included in the software of the operating system.

FIG. 4B provides the flow diagram illustrating the manner in which system 320 is used. Upon program start up (step 350) the decompressed operating system and compressed program code and read only data are stored in their respective portions of main memory 324 (step 352). After this initial loading of main memory 324, CPU 322 will undertake its normal processing operations. During such operations, CPU 322 requests read only data which is contained in a compressed format in portion 334, using the virtual memory address.

Similar to the system 120 discussed in connection with FIGS. 2A and 2B, the operating system of system 320 determines that although the requested data is actually in the physical memory space of main memory 324, it effectively is not. Thus the demand paging operation will be invoked to bring the requested compressed program code and read only data into portion 332 of main memory 324. At the time that such compressed data is transferred between main memory 324 portion 334 and 332, it will be processed by decompressor 340 and decompressed to its true binary format, which is usable by CPU 322. After such data is decompressed, CPU 322 uses the decompressed data to generate read/write data pursuant to normal system operations (step 354).

Similar to the operation of system 220 discussed in connection with FIGS. 3A and 3B, the read/write data generated is then stored in portion 336 of main memory 324, which is the segment that is intended to include decompressed read/write data, until it is paged out (step 360). As discussed in connection with FIGS. 3A and 3B, when it becomes necessary for data in portion 336 to be "paged out" in accordance with the implemented page replacement policy, system 320 will transfer the decompressed read/write data out of portion 336. That decompressed data will be processed through compressor/decompressor 342 such that it is compressed by COMP-ALG before it is stored in portion 338.

If CPU 322 wishes to further process read/write data which is no longer in portion 336, because it has been paged out to portion 338, the operating system will treat the requested data as effectively absent from physical main memory 324. Using a virtual address produced by CPU 322, the operating system will locate the requested, compressed data and undertake a demand paging operation to bring the requested data into portion 336 of main memory 324. At the time that such compressed data is transferred between memory portions 338 and 336 it will be processed by compressor/decompressor 342 and decompressed to its true binary format, which is usable by CPU 322. In this manner, read/write data can be continually moved back and forth between compressed portion 336 and decompressed portion 338 as required by the program operation (step 362). Additionally, it is also possible for decompressed program code and read only data to be deleted from portion 332 if additional space is required, given that such unmodifiable data can always be accessed in the compressed portion 334 of main memory 324.

Given that system 320 combines the features of systems 120 and 220, it is capable of using the least amount of main memory 324 storage space of the systems discussed thus far. Comparing system 320 with the 10 Mbyte model, embedded system discussed above, system 320 can include the same amount of data in main memory 324 using only 5 Mbytes of storage. In such an implementation, there is 1 Mbyte of storage space allocated for the operating system, 2 Mbytes allocated for compressed program code and read only data, 0.5 Mbyte allocated for compressed program code and read only data, 1 Mbyte allocated for the compressed version of read/write data, and 0.5 Mbyte allocated for the decompressed version of read/write data. Thus, system 320 can store the same amount of information as the model 10 Mbyte system using approximately one half the storage space.

C. PREFERRED COMPRESSION AND DECOMPRESSION ALGORITHM.

The preferred embodiment of the present invention is implemented on a general purpose computer having an 8-bit byte and 512 byte page architecture. Additionally, COMP-ALG and DECOMP-ALG are C-language implementations of the compression and decompression algorithms. COMP-ALG and DECOMP-ALG are incorporated into the operating system of the computer such that COMP-ALG compresses data during a page out operation, and DECOMP-ALG decompresses data during a demand paging operation.

In the preferred embodiment, the C-language implementation is made up of four source code files which are listed and described as follows:

dcode.h - - - the file containing common definitions for data compression and decompression;

dcodex.c - - - the file containing the decompression routines;

ncode.h - - - the file containing the data compression routine interface definitions; and ncodex.c - - - the file containing the compression routines.

The C language source code for these files is shown on attached Appendix A.

In order to load the preferred COMP-ALG and DECOMP-ALG into the operating system of a target computer, such as the computers shown in FIGS. 1A, 2A, 3A, and 4A, the referenced source code files are first compiled by a C compiler program. The C compiler program need not be resident on the target computer, rather once the source codes are compiled, they can be loaded into the target computer, over a network, for example.

The particular embodiments of COMP-ALG and DECOMP-ALG have the capability to compress and decompress data on the page boundary. In this implementation, for example, they compress and decompress 512 bytes of data, which is one page. Thus, the algorithms are adapted for use in connection with a demand paging operation in which the size of the page is 512 bytes. It will be clear to those skilled in the art, that other compression/decompression algorithms may be used depending upon the size of the pages that are stored in a given system and transferred as part of a demand paging or a page out operation.

Although particular hardware requirements and a specific source code implementation have been detailed above, it will be clear to those skilled in the art that this invention may be implemented in other computer systems using other program code. Such departures are nonetheless within the spirit and scope of this invention. Accordingly the invention in its broader aspects is not limited to the specific details, representative apparatus, and illustrative examples shown and described herein.

What is claimed is:

1. An apparatus for processing data in an embedded system, the apparatus comprising:
   an embedded system comprising a data processing unit coupled to a main memory, wherein the main memory is loaded with data at commencement of the data processing;
   a first memory portion within the main memory of the embedded system storing uncompressed data accessed by the data processing unit, the data processing unit accessing data in said first memory portion by transmitting an address;
   a second memory portion within the main memory of the embedded system storing data in a compressed format;
   means for determining when the address corresponds to data in the second memory portion;
   a memory unit for performing a demand paging operation through which data is transferred from said second memory portion to said first memory portion when the requested data is in the second memory portion without accessing memory devices auxiliary to the main memory; and
   means for decompressing compressed data when it is transferred during the demand paging operation.

2. The apparatus as in claim 1, wherein said decompressing means includes a decompression algorithm which decompresses the compressed data stored in said second memory portion during the demand paging operation.

3. The apparatus as in claim 2, wherein said decompression algorithm decompresses data on a page boundary.

4. The apparatus as in claim 3, wherein said decompression algorithm includes the source code file entitled "dcodex.c" in Appendix A.

5. The apparatus as in claim 1, wherein said decompression means comprises a hardwired circuit.

6. An apparatus for processing data in an embedded system, the apparatus comprising:
   a main memory in the embedded system for storing data accessed by a central processing unit (CPU), the CPU accessing data in said main memory by transmitting an address, said main memory being divided into a compressed portion containing compressed data and a decompressed portion containing decompressed data and being adapted for loading at initiation of the data processing;
   a memory unit for performing a demand paging operation through which data is transferred from said compressed portion to said decompressed portion, without accessing memory devices auxiliary to said main memory, when the requested data is not present in said decompressed portion; and
   means for decompressing the compressed data when it is transferred during the demand paging operation.

7. The apparatus as in claim 6, wherein said decompressing means comprises a decompression algorithm which decompresses data stored in said compressed portion during a demand paging operation.

8. The apparatus as in claim 7, wherein said decompression algorithm decompresses data on a page boundary.

9. The apparatus as in claim 8, wherein said decompression means comprises a hardwired circuit.

10. The apparatus as in claim 7, wherein said decompression algorithm includes the source code file entitled "dcodex.c" in Appendix A.

11. The apparatus as in claim 6, wherein said memory unit also pages out data from said decompressed portion, if additional storage space is needed in said decompressed portion.

12. The apparatus as in claim 11, wherein during a page out operation, data in said decompressed portion is transferred to said compressed portion.

13. The apparatus as in claim 12, further comprising a means for compressing data transferred from said decompressed portion to said compressed portion.

14. The apparatus as in claim 13, wherein said compressing means comprises a compression algorithm.

15. The apparatus as in claim 14, wherein said compression algorithm compresses data on a page boundary.

16. The apparatus as in claim 15, wherein said compression algorithm includes the source code file entitled "ncodex.c" in Appendix A.

17. A method of processing data in an embedded system comprising the steps of:
   allocating a first portion of a main memory in the embedded system for decompressed data and a second portion of the main memory in the embedded system for compressed data;
   initially loading data from a network or auxiliary storage into the main memory;
   processing a virtual address, transmitted by a central processing unit (CPU) so that the CPU can access the data, to determine whether the requested data is present in the second portion of the main memory, the main memory being directly accessible to the CPU;
   transferring the requested data through a demand paging operation from the second portion to the first portion when the requested data is absent from the first portion but present in the second portion of the main memory, wherein the transferring is accomplished without accessing the network or the auxiliary storage; and
   decompressing the requested data when it is transferred during the demand paging operation.

18. The method as in claim 17, wherein said decompressing step is performed on a page boundary.

19. The method as in claim 17, wherein said decompressing step is performed using a decompression algorithm.

20. The method as in claim 17, further comprising the step of:
   transferring data from the first portion when additional storage space is needed in the first portion.

21. The method as in claim 20, wherein the transfer of data from the first portion is carried out by an operating system which performs a page out operation.

22. The method as in claim 21, further comprising the steps of:
   compressing data transferred from said first portion; and
   storing the compressed data in the second portion during a page out operation.

23. The method as in claim 22, wherein said decompressing step is performed using a hardwired circuit.

24. The method as in claim 22, wherein said compressing step is performed using a compression algorithm.

25. The method as in claim 22, wherein said compressing step is performed using a hardwired circuit.

* * * * *